United States Patent [19]
Campbell et al.

[11] Patent Number: 5,752,688
[45] Date of Patent: May 19, 1998

[54] SUPPORT ASSEMBLY THAT IS SELECTIVELY REPOSITIONABLE AND ATTACHABLE TO DIFFERENT SIDES OF AN AIR COOLED MACHINE HOUSING

[75] Inventors: Rhody R. Campbell, Trenton, Ill.; Gerald R. Ernsky; Richard Belley, both of St. Louis, Mo.; Eric Coupart, Angouleme, France

[73] Assignee: Emerson Electric Co., St. Louis, Mo.

[21] Appl. No.: 711,501

[22] Filed: Sep. 10, 1996

[51] Int. Cl.$^6$ .............................. F16M 3/00; H02K 5/00
[52] U.S. Cl. .................... 248/674; 248/672; 248/678; 310/64
[58] Field of Search .................... 248/672, 674, 248/678; 310/64, 89

[56] References Cited

U.S. PATENT DOCUMENTS

| | | | |
|---|---|---|---|
| 2,323,153 | 6/1943 | Pilson | 248/672 |
| 2,510,680 | 6/1950 | Byrnes | 248/672 |
| 3,268,996 | 8/1966 | Luketa | 248/678 |
| 3,333,799 | 8/1967 | Peterson | 248/674 |
| 4,103,192 | 7/1978 | Wendt et al. | |
| 4,322,646 | 3/1982 | Persson | |
| 4,415,824 | 11/1983 | Meier | |
| 4,786,833 | 11/1988 | Knobel | |
| 4,839,547 | 6/1989 | Lordo et al. | |
| 5,008,575 | 4/1991 | Ishimoto et al. | |
| 5,026,476 | 6/1991 | Ishimoto et al. | |
| 5,059,843 | 10/1991 | Ishimoto et al. | |
| 5,364,062 | 11/1994 | Doyle, Jr. et al. | 248/674 |

FOREIGN PATENT DOCUMENTS

| 0120087 | 6/1945 | Australia | 248/678 |
|---|---|---|---|

OTHER PUBLICATIONS

*Design News*, Power Transmission, pp. 88–90, Sep. 21, 1992.

*Primary Examiner*—Victor N. Sakran
*Attorney, Agent, or Firm*—Howell & Haferkamp, L.C.

[57] ABSTRACT

A support base is attached to a heat dissipating housing of a machine by specifically configured heat dissipating ribs provided on several sides of the housing which are employed to selectively attached the support base to any one of the several sides of the housing and to attach the support base for sliding adjustment movement of the base relative to the housing.

33 Claims, 4 Drawing Sheets

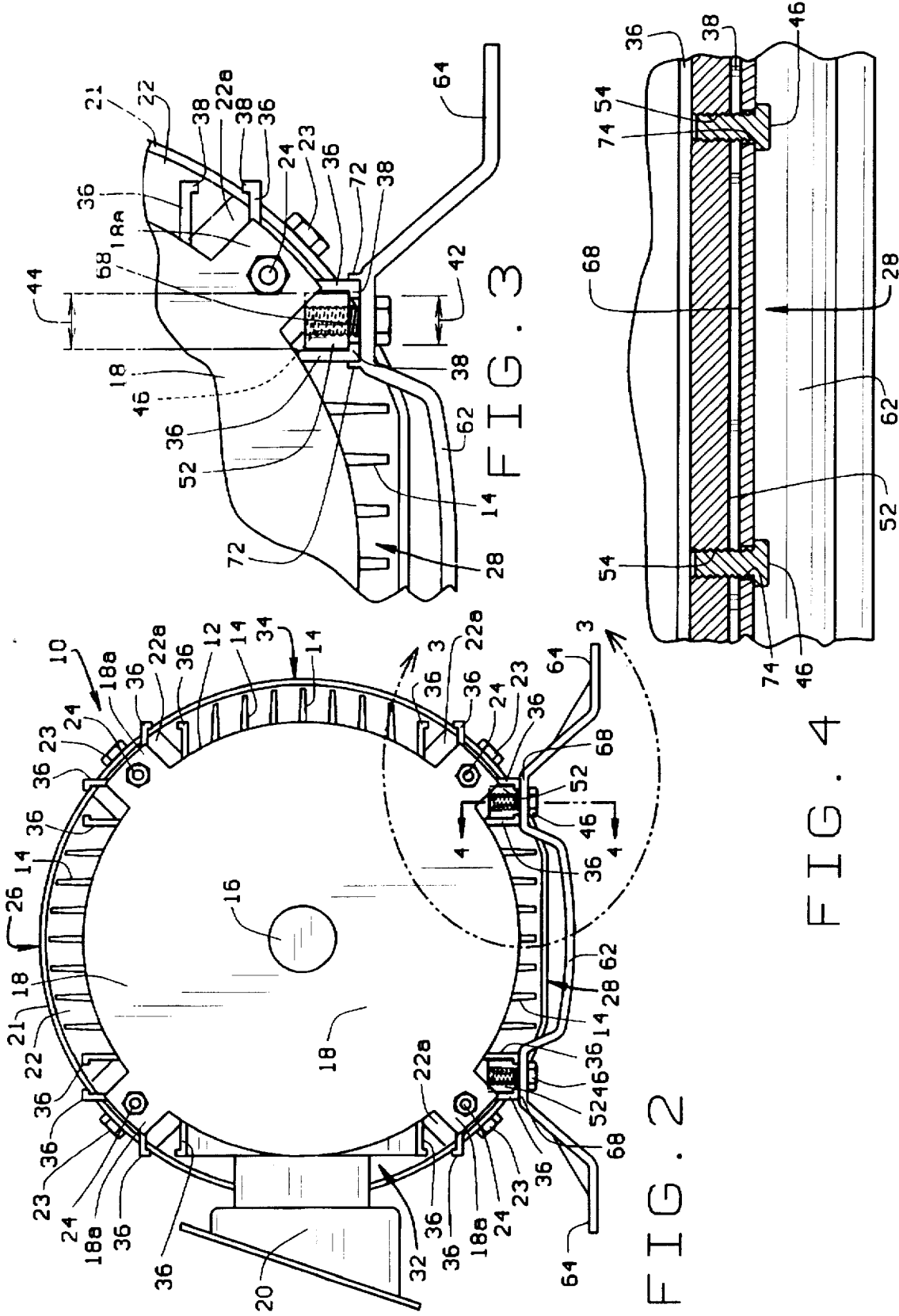

SUPPORT ASSEMBLY THAT IS SELECTIVELY REPOSITIONABLE AND ATTACHABLE TO DIFFERENT SIDES OF AN AIR COOLED MACHINE HOUSING

BACKGROUND OF THE INVENTION

(1) Field of the Invention

The present invention relates generally to an assembly for attaching a support base to a heat dissipating housing of a machine where specifically configured heat dissipating ribs on several sides of the housing are employed to selectively and adjustably attach the support base to any one of the several sides of the housing.

(2) Description of the Related Art

The construction of a conventional dynamic electric machine typically includes a substantially cylindrical stator frame having a plurality of heat radiating ribs or fins extending longitudinally across its exterior surface. Similar types of housing constructions are employed with various other types of machines where it is desirable to employ radiating fins to dissipate heat away from the machine contained in the housing. In the case of dynamic electric machines, the stator frame or housing is typically constructed of cast aluminum or cast iron.

To efficiently radiate heat from the machine contained in the housing, it is desirable to cover as much of the exterior surface of the housing as possible with the heat radiating ribs. However, it usually is not possible to form ribs over the entire exterior surface of the housing. Areas of the housing exterior must be provided for the connection of a junction box, through which the machine's electrical conductors pass, and provision must be made for casting feet to the housing exterior.

The feet are typically employed in mounting the housing to surrounding structure of the housing. For example, where the housing is a stator frame, two or more feet are cast on the exterior of the housing and are used to attach the stator frame to the surrounding structure of the device in which the dynamic electric machine is employed. A conventional mounting foot is cast as a solid metal block on the exterior of the stator housing. Typically, at least two such blocks, or two feet, are formed on the exterior of the housing. Bolt holes are usually drilled into the facing surface of each foot, and the facing surfaces themselves are usually machined to provide a smooth surface for attachment of the foot to a structure that supports the housing.

Because the positioning of the feet on the housing exterior depends on how and where the dynamic electric machine is to be mounted in use, a manufacturer of such machines is required to keep a large inventory of housings in stock. For example, if a customer of the manufacturer needs an electric motor with a junction box on its right side and housing mounting feet on its bottom, the manufacturer would have to have such a housing in his inventory to quickly provide the customer with the motor construction needed. If a customer desired an electric motor with the junction box positioned on the top of the motor housing and the mounting feet positioned on the left side of the motor housing, it would be necessary for the manufacturer to also have this housing construction in inventory to quickly provide the customer with the particular motor construction required.

It can be seen that, for a manufacturer of dynamic electric machines to be capable of quickly providing its customers with various different constructions of machine housings, the machine manufacturer must keep a large inventory of different types of housing constructions. In order for that manufacturer to accommodate both NEMA and metric standards, the inventory of machine housings would likely have to be doubled.

Casting aluminum housings with the large metal feet also created the problem of cooling stresses, where the mass of metal at the feet does not cool at the same rate after casting as the rest of the frame. The different rates of cooling often produces errors in the finished casting. The additional mass of metal required in the housing feet also contributes significantly to the cost of the housing.

SUMMARY OF THE INVENTION

It is an object of the present invention to provide a support assembly for an air cooled machine, where a support base for the machine is easily adjustably attached to the top, bottom, left or right side of the machine to thereby adapt a single housing of the machine for use in various different environments.

In the preferred embodiment of the invention, the housing is described as a stator frame of a dynamic electric machine. However, it should be understood that the support assembly of the invention is equally well suited for use with various different types of machines having housings with heat radiating ribs.

The repositionable support assembly for an air cooled machine that is the subject of the invention includes a housing having a plurality of longitudinally extending heat radiating ribs on its exterior. When employed with a dynamic electric machine, the housing also functions as the stator frame and the ribs extend across the exterior surface of the housing substantially parallel to the center axis of the machine shaft. A front wall or front flange is attached to the forward end of the housing and an end wall or end shield is attached to the rearward end of the housing. The machine shaft passes through the center of the front wall. A fan shroud covering a cooling fan is attached to the housing end wall.

In the preferred embodiment, the stator frame or housing is generally cylindrical with diametrically opposite top and bottom surfaces or sides, and diametrically opposite left and right surfaces or sides. Of the pluralities of longitudinal ribs extending over these four sides of the housing, on each housing side two pairs of ribs are specifically configured to enable the longitudinally adjustable attachment of a support base to each side of the housing. Each rib of each pair has a distal edge that turns inwardly toward the other rib of the pair. The inwardly turned edges of the ribs have a lateral spacing therebetween that is smaller than the lateral spacing between the ribs at their connection to the housing exterior surface. The lateral spacing between the distal edges is sufficiently large to permit the passage of fasteners therethrough. In the preferred embodiment, the fasteners are threaded fasteners such as screws or bolts, or a combination of screws or bolts used with a fastener bar.

A pair of fastener bars, each having a longitudinal length substantially equal to the longitudinal length of the specifically configured, inwardly turned ribs, is provided for insertion between each pair of turned ribs on one side of the housing. The width of each fastener bar is slightly smaller than the lateral spacing between the turned ribs, but is larger than the lateral spacing between the distal edges of these ribs. The bar has two or more threaded holes passing therethrough that are dimensioned to receive the screw threaded fasteners.

The support base has a pair of support surfaces that run longitudinally across the opposite sides of the base. A plurality of holes pass through these support surfaces. The holes are dimensioned to receive fasteners that are used to attach the support base, and its attached machine housing, to the structure of the apparatus in which the machine is to be used. From the support surfaces, the base extends inwardly and upwardly to a pair of crest surfaces that also run the longitudinal length of the support base. The crest surfaces are spaced laterally from each other a distance that corresponds to the lateral spacing between the pairs of turned ribs on each side of the machine housing. A plurality of holes pass through the crest surfaces of the base. The holes are longitudinally spaced from each other a distance that corresponds to the longitudinal spacing between the threaded holes that pass through the fastener bars. The holes in the crest surfaces are dimensioned sufficiently large to enable the threaded fasteners that screw thread into the holes in the fastener bars to pass freely through the holes in the crest surfaces. Because the lateral spacing between the crest surfaces corresponds to the lateral spacing between the pairs of turned ribs on the four sides of the housing, the support base may be attached to any of the four sides of the housing.

In assembling the support base to one of the four sides of the housing, the fastener bars are first loosely attached to the tops of the support base crest surfaces. The screw threaded fasteners are inserted through the holes in the support base crest surfaces from the underside of the support base so that the head of each fastener engages against the underside of the support base at the crest surfaces. The fastener bars are then positioned above the crest surfaces and each of the threaded fasteners is then screw threaded into a complimentary screw threaded hole in the fastener bars sufficiently to just start the threaded fasteners in the fastener bar holes. This leaves the fastener bars loosely attached to the tops of the support base crest surfaces so that they can be held above the tops of the crest surfaces.

Starting at the front of the housing, the front wall of the housing is first removed. The loosely attached fastener bars are inserted into the lateral spacing between the pairs of inwardly turned ribs, and the fasteners connecting the bars to the base are passed through the lateral spacing between the inwardly turned distal edges of the pairs of ribs. The front wall is then reattached to the housing. The fastener bars are slid through the pairs of ribs until the ends of the fastener bars abut against the end wall or end shield of the housing or against the fan shroud, thus adjustably positioning the support base relative to this end of the housing. If the support base is to be adjustably positioned relative to the front of the housing, the fastener bars are slid through the pairs of ribs until the ends of the fastener bars abut against the front wall of the housing. In this way, the support base can be adjustably positioned in two positive locations relative to the housing. With the support base in its desired positioned, the threaded fasteners are then tightened to cause the fastener bars to be adjusted toward the crest surfaces of the support base and grip the inwardly turned distal edges of the pairs of ribs between the fastener bars and the base crest surfaces. In this manner, the support base may be adjustably attached to any side of the housing to best position the base for attachment to a support structure while maintaining a desired orientation of the housing.

BRIEF DESCRIPTION OF THE DRAWINGS

FIG. 2 is a front elevation view of the machine of FIG. 1;

FIG. 3 is a partial view showing the detail of a connection between the housing and support base of the invention;

FIG. 4 is a partial sectioned view showing the detail of the connection between the housing and support base of the invention;

DESCRIPTION OF A PREFERRED EMBODIMENT

Figure 1:
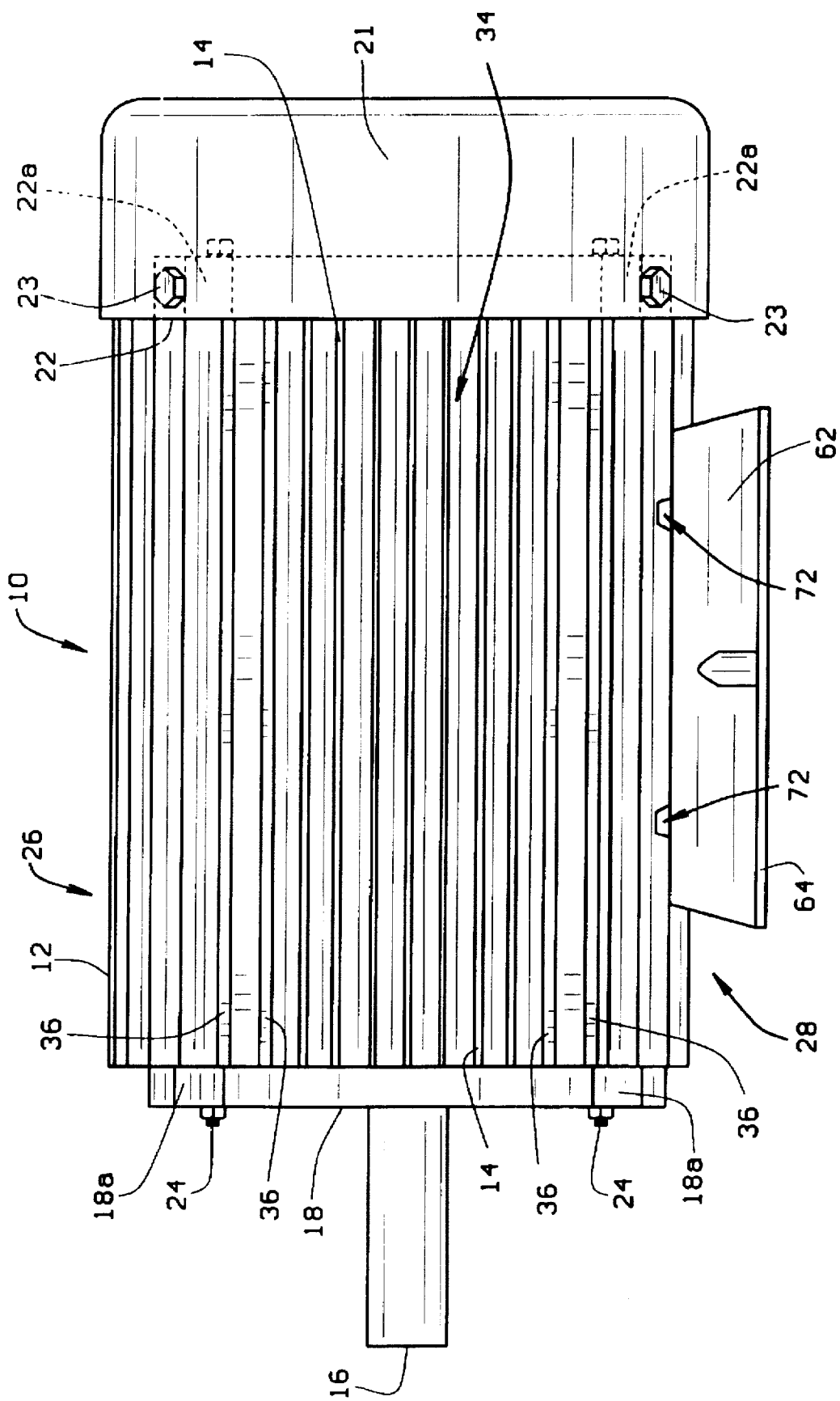
FIG. 1 is a side elevation view of a dynamic electric machine employing the support assembly of the invention.
Figure 5:
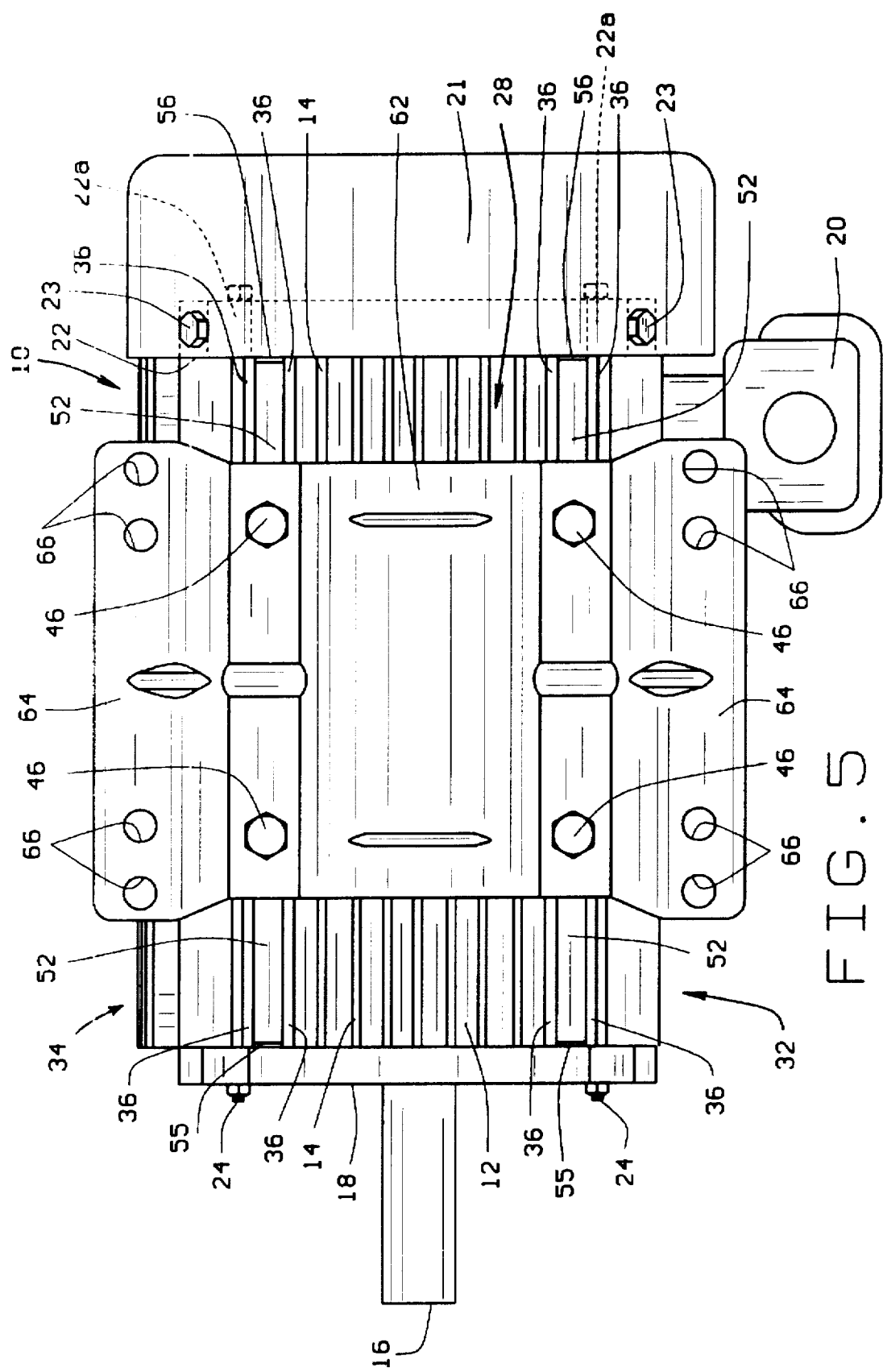
FIG. 5 is a bottom plan view of the support assembly of the invention.

FIG. 1 shows a dynamic electric machine 10 that employs the support assembly of the invention. The use of the support assembly of the invention on the machine shown in FIG. 1 and the other drawing FIGS. 2–5 are for illustrative purposes only. It is not necessary that the support assembly be employed with dynamic electric machines such as the type shown, and it should be understood that the support assembly of the invention may be employed with various different types of apparatus which require heat dissipating ribs on their housing exterior surfaces.

The repositionable support assembly of the invention is generally comprised of pairs of specifically configured heat dissipating ribs formed on the exterior surfaces of the dynamic electric machine 10, a support base, and pairs of fastener assemblies that are employed to selectively and adjustably attach the support base to the various sides of the machine 10 and thereby adapt the machine for attachment to a structure of an apparatus in which the machine is to be used.

In the illustrative environment of the invention shown in the drawing figures, the housing 12 also functions as the stator frame of the electric machine 10. A plurality of cooling fins or ribs 14 are formed on the exterior surface of the housing and extend across the surface substantially parallel to the center axis of the machine shaft 16. The majority of the ribs 14 have planar configurations and project vertically or horizontally from the sides of the housing to which they are attached. This is best seen in FIG. 2 of the drawing figures. The housing also has a front wall or front flange 18 attached to the forward end of the housing, and an end wall or end shield 22 attached to the rearward end of the housing. The machine shaft 16 passes through the center of the front wall 18, and a junction box 20 is attached to a side of the housing proximate the end wall 22. Referring to FIGS. 1 and 2, it can be seen that sections of the periphery of the housing end wall 22 are spaced radially outwardly of the distal edges of the ribs 14. These radial extensions 22a of the end all 22 support a fan shroud 21 that covers a cooling fan (not shown) mounted on the rearward end of the motor shaft 16. The shroud 21 is attached to the wall extensions 22a by threaded fasteners 23. The periphery of the housing front wall 18 generally corresponds to the exterior surface of the housing from which the ribs project except for a plurality of radial extensions 18a on the periphery of the front wall 18 that generally align with the radial extensions 22a of the rear end wall 22. As shown in FIG. 2, the housing front wall 18 and rear end wall 22 are attached to the housing 12 by four screw threaded fasteners 24 that pass through the radial extensions 18a, 22a of the two end walls.

The housing 12 is generally cylindrical with diametrically opposite top 26 and bottom 28 surfaces or sides, and diametrically opposite left 32 and right 34 surfaces or sides. These four quadrants of the housing exterior are separated from each other by the positioning of the front and rear end wall fasteners 24 as best seen in FIG. 2. This labeling of the four sides of the housing as top, bottom, left and right sides is only for the particular orientation of the housing shown in FIG. 2. It should be understood that the labeling of a housing side as a top, bottom, left or right side is not intended to place any limitations on the orientation of the housing. To the contrary, it is a principle benefit of the invention that it may be used in securing a machine housing relative to its structural surroundings by mounting any one or more of the top, bottom, left or right sides of the housing to those surroundings, which ever is most convenient. As viewed in FIG. 2, the apparatus of the invention may be employed equally well with the housing if it were rotated clockwise 90° so that the left side of the housing is now in the top side position and the right side of the housing is now in the bottom side position. Therefore, the labeling of the housing sides as the top, bottom, left and right sides is for illustrative purposes only and should not be interpreted as limiting.

Of the pluralities of longitudinal ribs extending over the four sides of the housing, on each side of the housing two pairs of ribs 36 are specifically configured to enable the longitudinally adjustable attachment of the support base to each side of the housing. Although each of these specifically configured ribs 36 differs slightly from the remaining ribs 14 of the plurality, the thickness of all of the ribs 14, 36 and of the housing itself is more uniform, not requiring the thick metal pads or feet employed on prior art housings for attachment of mounting assemblies to the housings. Because the thickness of the ribs and housing walls in the present invention is more uniform, it is possible to obtain more consistent product quality from an extrusion of the housing 12 of the invention.

Each of the specifically configured ribs 36 of each pair has a distal edge 38 that turns inwardly toward the other rib of the pair. As shown in the detail of FIG. 3, each of these ribs of each pair is a mirror image of the other rib of the pair. The inwardly turned edges 38 extend the entire longitudinal length of the ribs. The edges 38 have a lateral spacing 42 therebetween that is smaller than the lateral spacing 44 between the proximal ends of the ribs that connect the ribs to the housing exterior surface. The lateral spacing 42 between the rib distal edges 38 is sufficiently wide to permit the insertion of fasteners therethrough or the passage of fasteners therebetween as will be explained. In the preferred embodiment, the fasteners 46 are threaded fasteners such as screws or bolts, or a combination of screws or bolts used with a fastener bar 52.

The fastener assemblies employed with the housing 12 include a pair of fastener bars 52, each of which has a longitudinal length substantially equal to the longitudinal length of the pairs of inwardly turned ribs 36 on each side of the housing. As seen in FIGS. 2 and 3, the bars have a generally square cross section and the width of each fastener bar 52 corresponds to the lateral spacing 44 between the proximal ends of the inwardly turned ribs and is larger than the lateral spacing 42 between the rib distal edges. This enables the fastener bars 52 to be inserted between the inwardly turned ribs 36 from the housing front wall end of the ribs once the front wall 18 has been removed. Each fastener bar has two or more threaded holes 54 passing through the bar. The threaded holes are dimensioned to receive the screw threaded fasteners 46. The longitudinal spacing of the threaded holes from the forward end 55 and rearward end 56 of the bar is predetermined in order to position the support base at an optimum position relative to the housing as will be explained.

The support base 62 is formed from a metal plate and has a pair of laterally spaced support surfaces 64 that extend longitudinally across opposite sides of the base. A plurality of holes 66 pass through the support surfaces. The holes 66 are dimensioned for receiving fasteners used to attach the base, and its attached machine housing 12, to structure of an apparatus in which the machine is to be used. As best seen in FIG. 2, from the support surfaces 62 on the opposite sides of the base, the base extends inwardly and upwardly to a pair of crest surfaces 68. The crest surfaces 68 also extend the longitudinal length of the support base. The crest surfaces 68 are spaced laterally from each other a distance that corresponds to the lateral spacing between the pairs of turned ribs 36 on each side of the machine housing 12. In the preferred embodiment of the support base, the crest surfaces are formed with small containment tabs or shoulders 72 on their top surfaces that are spaced laterally from each other a distance corresponding to the lateral spacing between the outer most surfaces of the pairs of turned ribs 36 on each side of the housing 12. The tabs 72 can best be seen in FIG. 3. These tabs 72 can be formed by spot welds or by punching the tabs through the crest surfaces of the support base and bending them upwardly. The tabs engage over opposite sides of the ribs and prevent them from spreading apart when the fastener assemblies are tightened. A plurality of holes 74 also pass through the crest surfaces 68 of the base. The holes are dimensioned sufficiently large to enable the threaded fasteners 46 to pass freely through the holes and are longitudinally spaced from each other a distance that corresponds to the longitudinal spacing between the threaded holes 54 that pass through the fastener bars 52. It can be seen that the lateral spacing between the crest surfaces 68 enables those surfaces of the support base to engage against the rib distal edges 38 of the turned ribs 36 on each of the four sides of the housing 12.

The support base 62 is prepared for attachment to the machine housing 12 by first attaching the fastener bars 52 to the support base. The fastener bars 52 are positioned on the tops of the support base crest surfaces 68 with the fastener bar holes 54 aligned with the crest surface holes 74. The screw threaded fasteners 46 are then inserted through the crest surface holes 74 from the underside of the support base. Each threaded fastener 46 is passed through a crest surface hole and is screw threaded into a threaded hole 54 of the fastener bar sufficiently to just start the threaded fastener in the fastener bar hole. This loosely attaches the fastener bars 52 to the tops of the base crest surfaces 68 so that they can be held above the crest surfaces with a small spacing between the crest surfaces and the fastener bars. This spacing between the attached fastener bars and the crest surfaces is just slightly larger than the thickness of the inwardly turned distal edges 38 of the turned ribs 36.

The fastener bars 52, loosely attached to the support base 62, are then positioned at the front of the housing adjacent the side of the housing 12 to which the support base is to be attached. The housing front wall is removed, and the rearward ends 56 of the fastener bars are inserted into the lateral spacing between the pairs of inwardly turned ribs 36 while the fasteners 46 attaching the bars to the base are passed through the lateral spacing between the distal edges 38 of the ribs. With the fastener bars inserted between the ribs, the front end wall 18 is reattached to the housing. The fastener bars are slid through the pairs of ribs with each of the fasteners attaching the bars to the base passing between the rib distal edges 38 until the rearward ends 56 of the bars abut against the end wall 22 of the housing. The bar rearward ends abut against portions of the end wall extension 22a that partially traverse the lateral spacing 44 between the ribs. Additionally, or in lieu of engaging the end wall extensions 22a, the bar rearward ends abut against portions of the fan shroud which also partially traverse the rib lateral spacing. As stated earlier, it is preferred that the fastener holes 54 through which the threaded fasteners 46 attach the base 62 to the bars are spaced longitudinally from the bar rearward ends 56 to properly position the support base 62 longitudinally in its desired position on the housing 12 relative to the rearward end. With the support base so positioned with the fastener bars engaging the housing end wall 22, the threaded fasteners 46 are then tightened to cause the fastener bars to be adjusted toward the crest surfaces 68 of the support base. As the threaded fasteners are tightened, the fastener bars 52 grip the inwardly turned distal edges 38 of the pairs of turned ribs between the fastener bars and the base crest surfaces 68. Because the fastener bars and base crest surfaces engage the inwardly turned distal edges 38 of the pairs of ribs substantially along their entire longitudinal lengths, the stresses created in the ribs by the attachment of the support base to the housing are distributed along the longitudinal lengths of the pairs of ribs and are not concentrated in the areas of the threaded fasteners. If so desired in the particular use environment of the machine, an additional support base 62 can be attached to the housing adjacent the attached support base or on an opposite side of the housing of the support base.

In addition to adjustably positioning the fastener bars 52 relative to the rear end wall 22 of the housing, the fastener bars can be slid between the ribs to adjustably position them relative to the front end wall 18 of the housing. This is done simply by sliding the fastener bars forwardly until their forward ends 55 abut against the front wall 18 of the housing. In the drawing figures, the fastener bars 52 are shown having a longitudinal length substantially corresponding to that of the ribs. In other embodiments of the invention, the fastener bars 52 can have a shorter longitudinal length enabling them to be slid a greater distance either forwardly or rearwardly between the pairs of ribs. This enables the fastener bars to be used to slide the attached support base 62 rearwardly along the pairs of ribs until the rearward ends 56 of the fastener bars abut the rear end wall 22 or fan shroud 21, thus adjustably positioning the support base 62 in one position relative to the housing, or the fastener bars may be slid forwardly between the pair of ribs until the bar forward ends 55 abut against the front end wall 18 of the housing, thus adjustably positioning the support base 62 in a second adjusted position relative to the housing.

Additionally, the fastener bars 52 can be dimensioned so that they will adjustably position the support base 62 by only engaging the rearward ends 56 of the bars against the rear end wall 22 and/or fan shroud 21. With this embodiment, the radial extensions 18a of the housing front wall 18 can be reconfigured to a smaller configuration so that they do not traverse the portion of the lateral spacing 44 between the pair of ribs that is occupied by the fastener bar 52. In this alternate embodiment, it would no longer be necessary to remove the front end wall 18 from the housing in order to insert the pair of fastener bars 52 into the lateral spacing 44 between the ribs. The reconfigured front end wall radial extensions 18a would provide sufficient clearance at the front of the housing to enable insertion of the fastener bars 52 into the lateral spacing 44 between the ribs without removing the front end wall 18. However, in this alternate embodiment, the ability to adjustably position the support base 62 relative to the front of the housing by engaging the fastener bar forward ends 55 against the front end wall 18 is eliminated.

Figure 7:
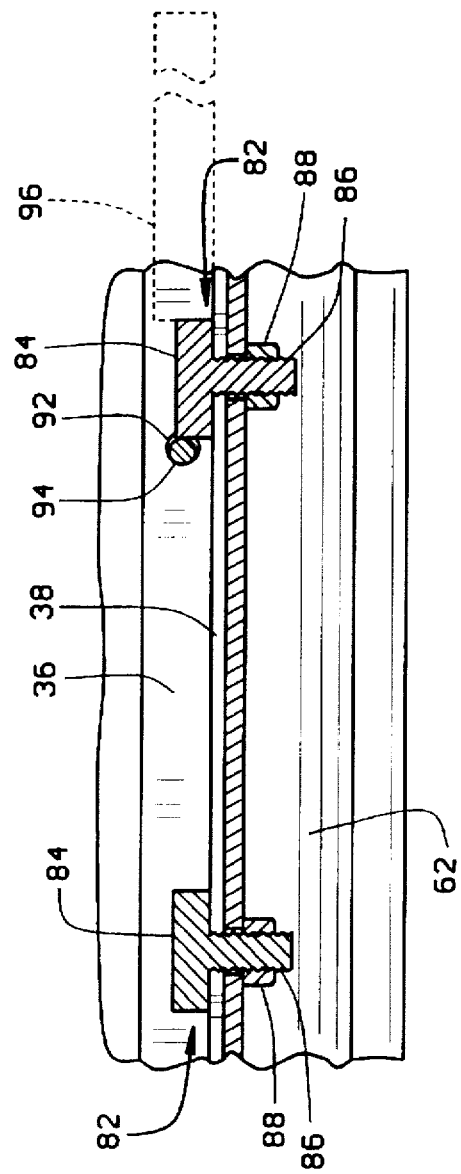
Figure 6:
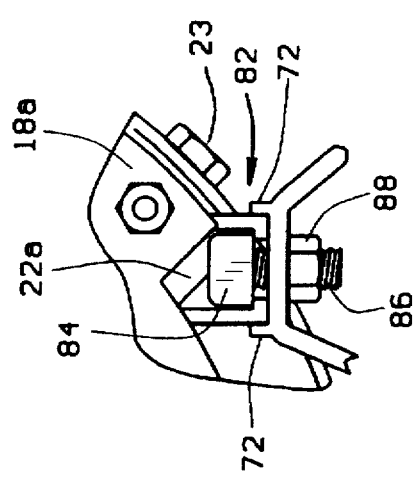
FIG. 6 is a partial view showing the detail of a further embodiment of the connection between the housing and support base of the invention; and, FIG. 7 is a partial sectioned view showing the further embodiment of the connection between the housing and the support base.

In lieu of using the fastener bars in attaching the support base to the housing, other threaded fasteners, for example the T-bolts 82 shown in FIGS. 6 and 7, may be used. The T-bolts have enlarged heads 84 with cross sections dimensioned similar to the cross sections of the fastener bars. Threaded shanks 86 extend from the heads. The heads of the T-bolts are passed through the lateral spacing between the turned ribs 36 in place of the bars, and the threaded shanks of the T-bolts are aligned with the crest surface holes 74 of the base. As with the use of the fastener bars, the front end wall 18 of the housing must first be removed to enable insertion of the T-bolt heads between the ribs 36. Alternatively, the radial extensions 18a of the front end wall or the T-bolt heads 84 could be reconfigured to allow passage of the T-bolt heads into the lateral spacing 44 of the ribs without removing the front end wall 18 (as shown in FIG. 6). Once the T-bolts are inserted, the front end wall 18, if removed, is then reattached to the housing. The threaded shanks 86 are then inserted through the crest surface holes and a nut 88 is screw threaded onto the shanks on the underside of the support base in attaching the support base to the housing.

When using the T-bolt fasteners, the automatic axial relative positioning of the support base to the housing can be achieved in a number of ways. For example, small spot welds can be formed on the interior surfaces of the ribs 36 or small detents could be made in the turned ribs 36 sized to prevent passage of the T-bolt heads 84 through the rib lateral spacing 44 beyond the welds or detents. When the T-bolt head 84 abuts against the weld or detent, the support base 62 is positioned in its desired adjusted positive location relative to the housing. However, modifying the motor ribs with permanent stops in this manner sacrifices the ability to adjust the support base position relative to the motor housing in the field, as forming abutments of this type would likely be easier done by the manufacturer or distributor of the motor. An additional alternative involves drilling lateral holes through the turned ribs 36 at a desired adjustment position and inserting a removable pin, such as a cotter pin, through the drilled holes. The T-bolts are then slid through the lateral spacing 44 of the ribs until they abut the inserted pin, thus adjustably positioning the support base 62 relative to the motor housing 12. Illustrations of the drilled adjustment holes 92 and an associated adjustment pin 94 are shown in phantom lines in FIG. 7. It can be seen that by providing pluralities of pairs of adjustment holes 92 along the longitudinal lengths of the turned ribs 36, the positively located position of the support base 62 relative to the housing 12 can be adjusted by inserting the pin 94 in a desired adjustment hole 92, thus limiting the adjusting movement of the T-bolt heads 84 through the lateral spacing 44 between the ribs.

In addition to providing a weld or detent on one of the turned ribs 36 to engage with and limit the longitudinally adjusting movement of the T-bolts 82, a weld or detent can be formed on the distal edge 38 of the rib in a position where it will engage with either the forward or rearward edge of the support base 62. This arrangement also provides a method of positively locating the support base relative to the housing. However, like providing the weld or detent on the interior of the inturned ribs 36 where it will engage with the T-bolt head 84, providing the weld or detent on the exterior of the rib distal edge 38 forms a permanent locating device on the motor housing that cannot be adjusted.

In a further variant embodiment, a longitudinally extending arm could be provided on the forward and/or rearward edges of the support base 62. The extending arm could be configured to extend up into the lateral spacing 44 between the inturned ribs 36 to such a position where it will engage with the housing front end wall 18, rear end wall 22 or the fan shroud 21. Engagement of the extending arm with one or more of the these component parts of the motor provides another method of positively locating the support base 62 in a longitudinally adjusted position relative to the motor housing 12.

In a still further variant embodiment, a separate gauge or spacer 96, such as that shown in phantom lines in FIG. 7, may be used to adjustably position the support base 62 in a positive location relative to the motor housing 12. In use of such a spacer 96, it is first inserted through the mutually opposed distal edges 38 of the ribs into the lateral spacing 44 between the ribs. One edge of the spacer is then moved to abut against either the motor housing front end wall 18 or the housing rear end wall 22 or the fan shroud 21. The support base 62 may then be adjustably positioned longitudinally along the ribs until its forward or rearward edge engages against the spacer 96, thus locating the support base at a positive position relative to the motor housing. It is not necessary that such a spacer be configured to engage against the support base 62, but could be configured to engage against the fastener bar 52, the T-bolt heads 84, or some other fixture connected to the support base in positively locating the support base relative to the housing.

Additionally, although it is preferred to dimension the fastener bars so that their rearward ends abut the housing end wall 22 when the base is at its desired longitudinal position relative to the housing, the longitudinal lengths of the fastener bars may be shortened so that the position of the support base relative to the housing may be adjusted longitudinally forwardly and rearwardly relative to the housing. This would also enable the housing to be adjusted longitudinally after the support base 62 has been attached to the structure of the apparatus in which the machine is to be used.

Additional support bases 62 having different vertical spacing between their support surfaces 64 and the tops of their crest surfaces 68 may be provided to adjust the height of the shaft 16 relative to the base support surfaces 64 by selectively attaching the different sized bases to the housing.

From the above description, it can be seen that the repositionable support assembly of the invention enables the use of multiple support bases with the machine housing to provide several mountings of the machine housing to the structural environment in which it is used. Different size support bases enable the adjustment of the shaft spacing of the machine from the structure to which it is attached, and different size fastener bars enable the longitudinal adjustment of the machine housing 12 relative to the support base 62 and the structure to which the base is attached. The ability to attach the base to any one of the four sides of the housing enables the housing to be adjustably positioned about its center axis. In the illustrative embodiment of the dynamic electric machine housing, this enables the housing to be easily mounted in compliance with NEMA F1, F2 or F0 standards, with the housing junction box 20 positioned on the left, right or top of the housing.

While the present invention has been described by reference to a specific embodiment, it should be understood that modifications and variations of the invention may be constructed without departing from the scope of the invention defined in the following claims.

What is claimed:

1. A repositionable support assembly for an air cooled machine, the assembly comprising:

a housing having a plurality of longitudinally extending ribs, at least two of the ribs on one side of the housing presenting mutually opposed longitudinally extending edges with a lateral spacing between the opposed edges;

a plurality of fasteners positioned between the two ribs and extending through the lateral spacing between the opposed edges of the ribs; and, a support base held to the two ribs by the plurality of fasteners.

2. The assembly of claim 1, wherein:

the opposed edges of the two ribs are longitudinally extending distal edges of the ribs.

3. The assembly of claim 2, wherein:

the two ribs are positioned adjacent each other.

4. The assembly of claim 2, wherein:

the two ribs turn inwardly as they approach their distal edges so that the rib distal edges project toward each other with the lateral spacing therebetween.

5. The assembly of claim 2, wherein:

the housing has a configuration with opposite top and bottom sides and opposite left and right sides, the two ribs are positioned on one of the top, bottom, left and right sides, and pairs of ribs like the two ribs are positioned on the other of the top, bottom, left and right sides.

6. The assembly of claim 2, wherein:

a bar is inserted between the two ribs and the plurality of fasteners connect the support base to the bar.

7. The assembly of claim 6, wherein:

the plurality of fasteners connect the bar to the support base for adjustable movement of the bar relative to the base enabling movement of the bar toward the support base by adjusting the plurality of fasteners and enabling movement of the bar away from the support base by adjusting the plurality of fasteners.

8. The assembly of claim 7, wherein:

the plurality of fasteners are screw threaded fasteners that engage in screw threaded holes in the bar.

9. The assembly of claim 6, wherein:

the bar is dimensioned relative to the lateral spacing between the two ribs to enable the bar to slide longitudinally between the two ribs while being held adjacent the housing by the two ribs.

10. The assembly of claim 6, wherein:

the housing has longitudinally opposite forward and rearward ends and an end wall is attached to the rearward end of the housing, and the bar is longitudinally dimensioned to abut against the end wall to position the support base at a desired longitudinal position relative to the housing.

11. The assembly of claim 2, wherein:

the two ribs comprise one of two pairs of ribs on the one side of the housing, the ribs of each pair have distal edges with a lateral spacing between the distal edges;

the plurality of fasteners are positioned between the two ribs of each pair and extend through the lateral spacing between the distal edges of each pair of ribs; and, the support base is held to each pair of ribs by the plurality of fasteners.

12. The assembly of claim 11, wherein:

the housing has opposite top and bottom sides and opposite left and right sides, and the two pairs of ribs are positioned on one of the top, bottom, left and right sides of the housing, and two pairs of like ribs are positioned on each of the other of the top, bottom, left and right sides of the housing.

13. The assembly of claim 11, wherein:

two bars are received in sliding engagement between the two ribs of the pairs of ribs and the plurality of fasteners connect each bar to the support base.

14. The assembly of claim 13, wherein:

an end wall is attached to the housing and the two bars are longitudinally dimensioned to abut against the end wall to position the support base at a desired longitudinal position relative to the housing.

15. The assembly of claim 13, wherein:

a fan shroud is attached to the housing and the two bars are longitudinally dimensioned to abut against the fan shroud to position the support base at a desired longitudinal position relative to the housing.

16. A repositionable support assembly for an air cooled machine, the assembly comprising:

a housing having opposite top and bottom sides, and opposite left and right sides, a plurality of ribs extending over each of the sides of the housing with at least two pairs of ribs on each side of the housing having configurations that are the same;

a support base; and, a plurality of fasteners attached to the support base, the fasteners are adapted to be inserted between the two ribs of each pair of ribs on any side of the housing to selectively attach the support base to each side of the housing.

17. The assembly of claim 16, wherein:

the two ribs of each pair of ribs are positioned adjacent each other and have distal edges that are turned inwardly toward each other, and the plurality of fasteners extend between the distal edges of the ribs of each pair.

18. The assembly of claim 17, wherein:

two bars are inserted between the two ribs of each pair of ribs on each side of the housing and engage along the distal edges of each pair of ribs, and the plurality of fasteners attach the bars to the support base to attach the support base to one side of the housing.

19. The assembly of claim 16, wherein:

the plurality of ribs extend longitudinally over each of the sides of the housing, and on each side of the housing the plurality of fasteners may be inserted for sliding engagement between the ribs of each pair of ribs to thereby attach the support base to the side of the housing for sliding movement relative to the housing.

20. The assembly of claim 16, wherein:

two bars are insertable between the two ribs of each pair of ribs on each side of the housing, and the plurality of fasteners attach the bars to the support base to thereby attach the support base to one side of the housing.

21. The assembly of claim 19, wherein:

the plurality of fasteners attach the two bars to the support base for independent adjustable movement of the two bars toward and away from the support base.

22. The assembly of claim 19, wherein:

an end wall is attached to the housing and the two bars have lengths dimensioned to slide between the two ribs of each pair of ribs on each side of the housing and abut against the end wall to position the support base at a desired position relative to the housing.

23. The assembly of claim 19, wherein:

a fan shroud is attached to the housing and the two bars have lengths dimensioned to slide between the two ribs of each pair of ribs on each side of the housing and abut against the fan shroud to position the support base at a desired position relative to the housing.

24. A repositionable support assembly for an air cooled machine, the assembly comprising:

a housing having a plurality of longitudinally extending ribs, at least two of the ribs on one side of the housing having a lateral spacing therebetween and presenting mutually opposed longitudinally extending edges with a lateral spacing between the opposed edges;

a support base;

fasteners attached to the support base and extending through the lateral spacing to positions between the two ribs, the fasteners attaching the support base to the two ribs for longitudinally adjusting movement of the support base in opposite first and second directions relative to the two ribs; and, means for positively locating the support base in a longitudinally adjusted position relative to the two ribs.

25. The assembly of claim 24, wherein:

the means for positively locating the support base includes at least one abutment that at least partially traverses the lateral spacing between the two ribs at a fixed position relative to the two ribs, the abutment being positioned to engage with at least one of the fasteners and support base during longitudinally adjusting movement of the support base in one of the first and second directions relative to the two ribs, thereby preventing further adjusting movement of the support base in the one direction and positively locating the support base in a longitudinally adjusted position relative to the two ribs.

26. The assembly of claim 25, wherein:

the housing has a front end wall and a longitudinally opposite rear end wall, and the one abutment is a portion of one of the front and rear end walls that at least partially traverses the lateral spacing of the two ribs.

27. The assembly of claim 25, wherein:

the housing has a fan shroud attached thereto and the one abutment is a portion of the fan shroud that at least partially traverses the lateral spacing of the two ribs.

28. The assembly of claim 24, wherein:

the means for positively locating the support base includes first and second abutments that at least partially traverse the lateral spacing between the two ribs at first and second longitudinally spaced, fixed positions relative to the two ribs, the first abutment being positioned to engage with at least one of the fasteners and support base during longitudinally adjusting movement of the support base in the first direction relative to the two ribs, thereby preventing further adjusting movement of the support base in the first direction and positively locating the support base at the first position relative to the two ribs, and the second abutment being positioned to engage with at least one of the fasteners and support base during longitudinally adjusting movement of the support base in the second direction relative to the two ribs, thereby preventing further adjusting movement of the support base in the second direction and positively locating the support base at the second position relative to the two ribs.

29. The assembly of claim 28, wherein:

the housing has a front end wall and a longitudinally opposite rear end wall, the first abutment is a portion of the front end wall that at least partially traverses the lateral spacing of the two ribs and the second abutment is a portion of the rear end wall that at least partially traverses the lateral spacing of the two ribs.

30. The assembly of claim 28, wherein:

the housing has a front end wall and a longitudinally opposite fan shroud attached to the housing, the first abutment is a portion of the front end wall that at least partially traverses the lateral spacing of the two ribs and the second abutment is a portion of the fan shroud that at least partially traverses the lateral spacing of the two ribs.

31. The assembly of claim 24, wherein:

the fasteners include a bar positioned in the lateral spacing between the two ribs and bolts extending through the lateral spacing between the rib opposed edges and connecting the support base to the bar.

32. The assembly of claim 24, wherein:

the fasteners include T-bolts having heads positioned in the lateral spacing between the two ribs and shanks extending through the lateral spacing between the rib opposed edges and connected to the support base.

33. The assembly of claim 24, wherein:

the means for positively locating the support base includes a first stop that limits the longitudinally adjusting movement of the support base in a first direction toward a rear end wall of the housing, and includes a second stop that limits the longitudinally adjusting movement of the support base in a second direction toward a front end wall of the housing.

* * * * *